Figure 1:
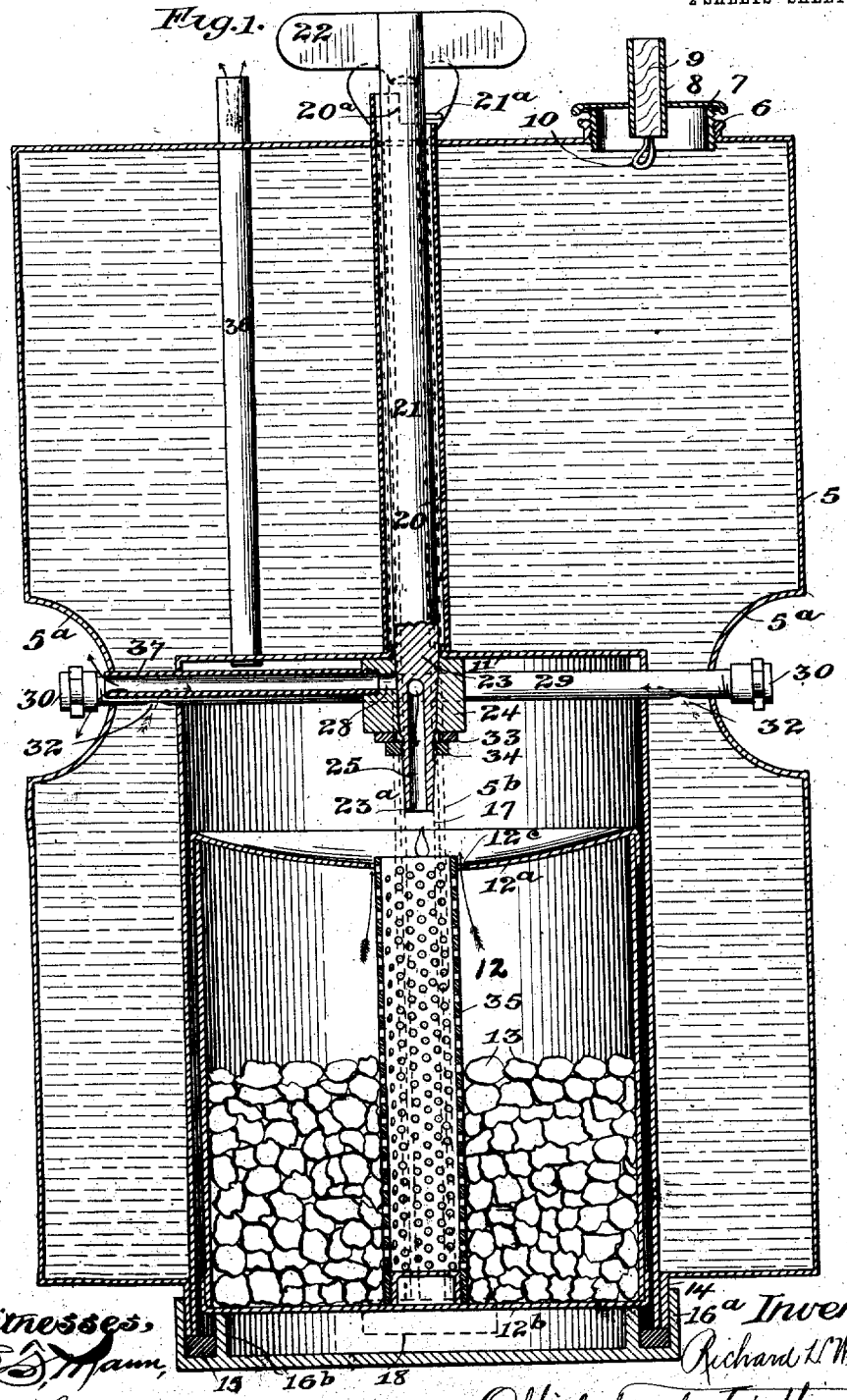

No. 12,787. REISSUED APR. 28, 1908.

R. H. WELLES.

ACETYLENE GENERATOR.

APPLICATION FILED NOV. 19, 1904.

2 SHEETS—SHEET 1.

Witnesses,
F. S. Mann,
A. N. Graves

Inventor;
Richard H. Welles
By Offield Towle & Linthicum,
Attys.

No. 12,787. REISSUED APR. 28, 1908.
R. H. WELLES.
ACETYLENE GENERATOR.
APPLICATION FILED NOV. 19, 1904.
2 SHEETS—SHEET 2.
Fig. 2.
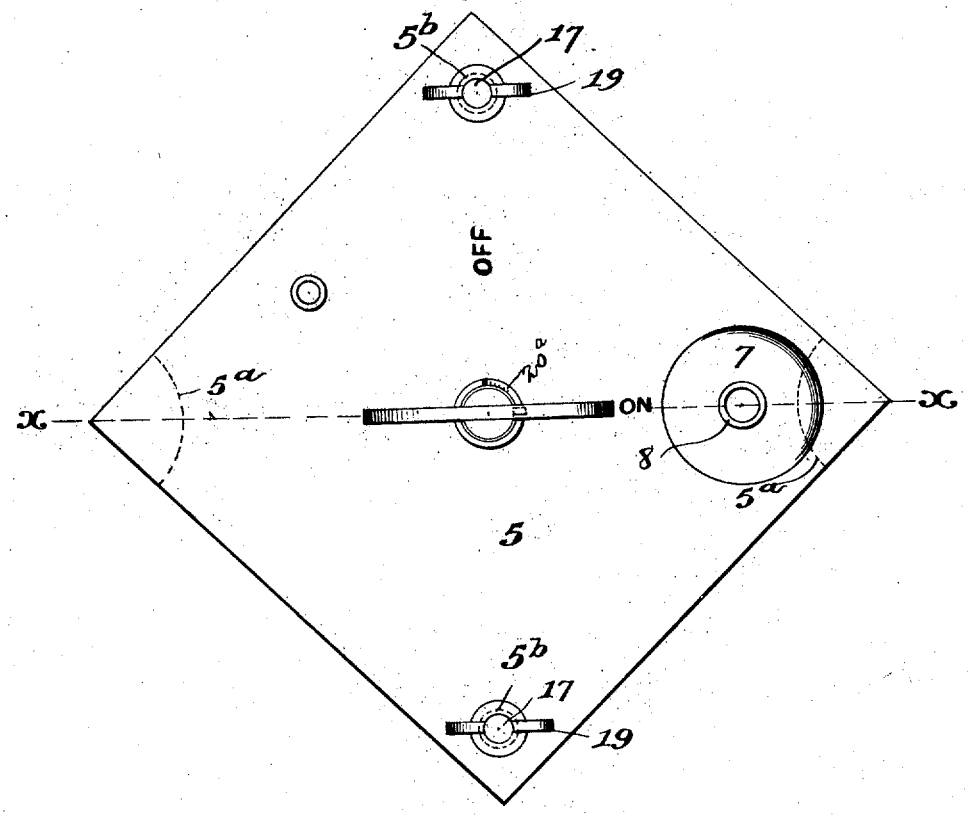
Fig. 3.
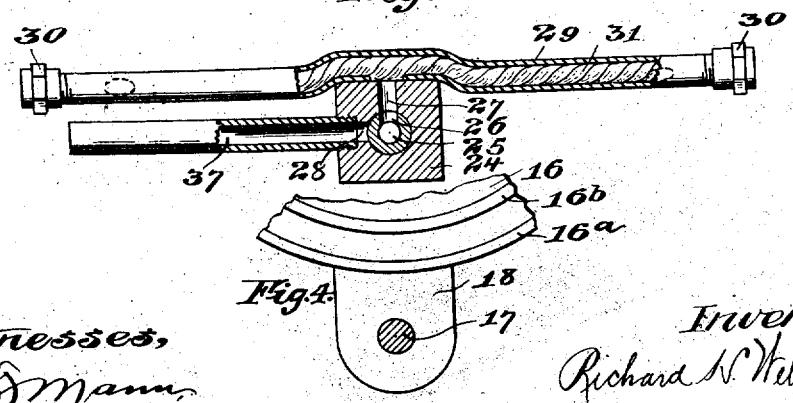
Fig. 4.
Witnesses,
S. S. Mann,
A. N. Graves
Inventor,
Richard H. Welles,
By Offield Towle & Linthicum,
Attys.

UNITED STATES PATENT OFFICE.

RICHARD H. WELLES, OF KENOSHA, WISCONSIN, ASSIGNOR TO THE BADGER BRASS MANUFACTURING COMPANY, OF KENOSHA, WISCONSIN, A CORPORATION OF WISCONSIN.

ACETYLENE-GENERATOR.

No. 12,787. Specification of Reissued Letters Patent. Reissued Apr. 28, 1908.

Original No. 737,183, dated August 25, 1903, Serial No. 130,537. Application for reissue filed November 19, 1904. Serial No. 233,540.

*To all whom it may concern:*

Be it known that I, RICHARD H. WELLES, a citizen of the United States, residing at Kenosha, in the county of Kenosha and State of Wisconsin, have invented certain new and useful Improvements in Acetylene-Generators, of which the following is a specification.

My invention relates to acetylene-generators, and more particularly to that class of portable generators designed to produce gas for use in furnishing headlights for vehicles, such as automobiles.

The object of my invention is to provide a simple, compact, safe, and easily-manipulated generator which will occupy but little space and be capable with a single charge of yielding gas for lighting purposes for a considerable period of time.

To this and other ends my invention consists in certain features of novelty and utility in a device of this character substantially as hereinafter described and claimed.

Referring to the accompanying drawings, wherein is shown a generator embodying the novel features of my invention in a preferred form, Figure 1 is a vertical longitudinal sectional view of the apparatus diagonally through the external casing of the generator on the line $x$—$x$ of Fig. 2; Fig. 2 is a top plan view; Fig. 3 is a detail view illustrating the means for introducing water to the carbid-chamber and means for controlling said introduction of water and the discharge of the residue of gas produced after the admission of water has been cut off; and Fig. 4 is a detail fragmentary view of a portion of the base of the generation-chamber, illustrating the means for uniting the latter to the base of the external casing or water-chamber.

Referring to the drawings for a more detailed description of the device, 5 designates the external casing of the generator, which is here shown as rectangular in cross-section, such a form being preferred for a variety of reasons, which will hereinafter appear. The casing 5 constitutes a water-chamber designed when the apparatus is fully charged to be entirely filled with water through an opening 6 in the top thereof, which opening may be closed by a threaded cap or stopper 7, through the cover of which extends a short vertical tube 8, filled with a porous fibrous wick 9, which serves to prevent evaporation or spilling of the water in the casing and at the same time to admit the necessary volume of air to fill the space previously occupied by the water as the latter is consumed in making the gas. For convenience in withdrawing or inserting the fibrous wick 9 one end of the latter is provided with a bent wire 10, attached thereto.

Centrally within the lower portion of the casing 5 is disposed a cylindrical casing 11, inclosing the generation-chamber of the apparatus, and within the casing 11 and occupying the major portion of the space thereof is disposed the cylindrical carbid-receptacle 12, adapted to contain a charge of carbid, (indicated at 13). The central circular portion of the lower end of the outer casing 5 is open and is surrounded by a depending flange 14, within which snugly fits the open lower end of the casing 11 of the generation-chamber, and the lower margins of the flange 14 and casing 11 seat upon a packing-ring 15, itself contained within an annular groove or channel formed on the inner face of the cap or cover 16 between a pair of outer and inner concentric flanges $16^a$ and $16^b$, respectively, the upper edge of the inner flange $16^b$ also constituting a seat or support for the bottom of the carbid-receptacle 12. The cover 16 is united thus in a gas and water tight union with the lower open ends of the casings 5 and 11 by means of a pair of oppositely-located vertical tie-rods 17, (see Figs. 2 and 4), the lower ends of which are secured in ears or lugs 18, projecting laterally and oppositely from the cover 16, said rods extending upwardly through vertical sleeves $5^b$ between the lower and upper walls of the casing 5 and extending through the latter and equipped on their upper ends with thumb-nuts 19, by turning up which the bottom cap or cover 16 is drawn tightly against the lower margins of the casings of the water and generation chambers in an obvious manner.

On the upper end of the casing 11 of the generation-chamber and centrally thereof is mounted a sleeve 20, the open upper end of which extends through the top wall of the water-chamber 5 and has a quadrant notch $20^a$, Fig. 2, cut therein, the vertical walls of which constitute stops for the stem of a valve-plug, hereinafter described. Fitted to turn freely within the sleeve 20 is a valve rod or stem 21, the upper end of which rises above the open upper end of the sleeve and is equipped with a cross-piece 22 for readily turning the same by the thumb and finger and with a radially-projecting pin 21[a], designed to cooperate with the notch 20[a] to effect the stop. The lower end of the rod 21 terminates in a conical valve-plug 23, which snugly fits a correspondingly-shaped bore in a valve-block 24, secured to the under side of the top wall of the casing 11. The valve-plug 23 is axially bored from its lower end, as shown at 25, up to a point where the bore intersects a lateral opening 26, Fig. 3, which latter is adapted to communicate with either of a pair of radial horizontal passages 27 and 28, formed in the valve-block 24 at right angles to each other.

Extending entirely across the water-chamber and at its opposite ends mounted in inwardly-curved walls 5[a] at opposite corners of said chamber is a horizontal tube 29, closed at its outer ends by threaded caps 30 and containing a filling of spongy or absorbent material in the nature of a wick 31. It will be observed that the tube 29 lies in a direction parallel with the diagonal of the top and bottom walls of the outer casing and passes through and across the upper end of the generation-chamber 11, said tube lying against one side of the valve-block 24 and having an opening therein which communicates with the radial passage 27 of the valve-block. The said tube is further provided on its under side at points between the outer wall of the casing 11 and the inner wall of the casing 5 with apertures 32, designed to admit water to the interior of the tube from the supply filling the water-chamber 5. The lower end of the valve-plug 23 extends downwardly below the valve-block 24 to constitute a discharge-nozzle 23[a] for water passing therethrough, and the outer surface of said nozzle is externally threaded to receive a washer 33 and nut 34, by which a tight joint between the valve-plug and the valve-block may be maintained.

Mounted in and between the upper and lower covers 12[a] and 12[b] of the carbid-receptacle 12 and coaxially thereof is a perforated tube 35, the upper open end of which is in line with and directly beneath the discharge-nozzle 23[a] of the valve-plug.

Tapping the top wall of the generation-chamber 11 is a gas-discharge pipe 36, which extends upwardly through the upper portion of the water-chamber and through the top wall of the latter and at its upper end may connect with the service-pipe leading to the burner or burners of the lamp. The valve-block 24 is also tapped by a laterally-extending blow-off pipe 37, which communicates at its inner end with the radial passage 28 of the block and through the latter with the axial bore of the valve-plug when the latter is turned to bring its aperture 26 into register with the passage 28. The outer end of the tube 37 extends through the side walls of the generation-chamber and of the water-chamber alongside of and parallel with the wick-tube 29, communicating at its outer end freely with the atmosphere.

To charge the generator, the thumb-nuts 19 are removed and the bottom cover 16 with-drawn, the tie-rods 17 being at the same time withdrawn through their containing-sleeves 5[b]. The carbid-receptacle is at the same time withdrawn from the generation-chamber, and the top cover thereof being removed the carbid is charged thereinto around the central perforated tube 35 and the cover replaced. The receptacle is then reinserted within the generation-chamber and the cover 16 reapplied, the gasket 15 being drawn hard against the lower ends of the water and generation chambers by the turning up of the thumbnuts 19. The cap 7 having then been removed, the outer casing is filled with water preferably to its entire capacity, and the cover 7 is then returned to closing position. Upon then turning the valve-plug until the cross-piece at the upper end thereof points to the word "On" on the top of the casing the aperture 26 of the valve-plug will be brought into register with the passage 27, and the water which enters the tube 29 and seeps through the absorbent filling thereof is free to trickle and drop through the vertical axial bore of the valve-plug down within the perforated tube 35, through the numerous apertures of which it trickles, attacking the surrounding carbid and thereby generating the gas, which rises through the tube and through an annular opening 12[c] in the cover of the carbid-receptacle surrounding the upper end of the tube and is finally discharged to the service-pipe through the discharge-pipe 36. When it is desired to discontinue the generation of the gas, the stem of the valve-plug is given a quarter-turn to a position where the cross-head 22 points to the word "Off," which movement throws the aperture 26 of the valve-plug out of register with the inlet-passage 27, cutting off the latter, and into register with the outlet-passage 28, communicating with the blow-off pipe 37, whereby any residuum of gas that may remain in the generation-chamber after the admission of water has been cut off is discharged to the atmosphere to relieve any abnormal pressure that might be created thereby. The generation of gas may be renewed at any time by a simple resetting of the valve-plug to a point to cut off the blow-off pipe and connect with the water-inlet tube.

It will be observed that in my improved generator the generation-chamber is entirely surrounded on all except its bottom side by water, which thus tends to keep down the heat that accompanies the liberation of the gas. By indenting the diagonally opposite vertical corners of the outer casing 5 at the points where the tubes 29 and 37 pass therethrough, as shown in Fig. 1, the ends of said tubes are sheltered in the recesses thus formed against injury resulting from accidental contact with external objects, which in a portable generator is a feature of considerable importance.

It will thus be seen that by my present invention I provide a portable generator specially adapted for use in connection with the lighting apparatus of automobiles and similar vehicles, owing to its small size and the compact and simple arrangement of its constituent parts.

While I prefer the rectangular form of the external casing herein shown, since it offers mechanical advantages, some of which have been pointed out, yet it will be evident that the form shown is not of the essence of the invention and that both it and the relative arrangement of the several elements of the device might be considerably modified without departing from the spirit and substance of the invention.

I claim:

1. In an acetylene-generator, the combination with a water-chamber, of a generation-chamber within and surrounded by said water-chamber, a carbid-receptacle within and wholly contained by said generation-chamber, a water-supply pipe extending across and through the upper end of said generation-chamber and outside of the latter communicating freely with said water-chamber, a water-controlling valve communicating with said water-supply pipe within the generation-chamber and controlling and directing the flow of water therefrom to the underlying carbid-receptacle, and a gas discharge pipe leading from said generation-chamber, substantially as described.

2. In an acetylene-generator, the combination with a water-chamber, of a generation-chamber within and surrounded by said water-chamber, a carbid-receptacle within and wholly contained by said generation-chamber, a water-supply pipe extending across and between the opposite side walls of said water-chamber and through the upper portion of said generation-chamber, said pipe having lateral openings communicating with said water and generation chambers, respectively, an absorbent filling in said pipe, and a valve controlling the flow of water from said pipe through the generation-chamber to the carbid-receptacle, substantially as described.

3. In an acetylene generator, the combination with a water-chamber and a generation chamber within and surrounded by said water-chamber, of a water-inlet pipe from said water-chamber to said generation chamber, a blow-off pipe from said generation chamber to the outer air, a valve-block in said generation chamber having two lateral passages in the same transverse plane, and a valve-plug turnable in said valve-block, said valve-plug having a duct one end of which communicates constantly with the generation chamber while its other end is adapted to communicate with either of the ways of said valve-block to the exclusion of the other, substantially as described.

4. In an acetylene-generator, the combination with a water-chamber and a generation-chamber within and surrounded by said water-chamber, of a water-inlet pipe extending across and through said water and generation chambers and having openings therein communicating with said water and generation chambers, respectively, means in said pipe for permitting a limited flow of water therethrough, a blow-off pipe from said generation-chamber to the outer air, a two-way valve-block in said generation-chamber, one way of which connects with said water-inlet pipe and the other with said blow-off pipe, a suitably ported valve-plug turnable in said valve-block to establish communication between the interior of the generation-chamber and either of said pipes, and means for turning said valve-plug extending to the exterior of said water-chamber, substantially as described.

5. In an acetylene-generator, the combination with a water-chamber and a generation chamber within and surrounded by said water-chamber, of a water-inlet pipe extending across and through said water and generation chambers and having openings therein communicating with said water and generation chambers, respectively, means in said pipe for permitting a limited flow of water therethrough, a blow-off pipe from said generation-chamber to the outer air, a valve-block secured to the inner wall of said generation-chamber and having two radially-arranged passages one of which communicates with said water-inlet pipe and the other with said blow-off pipe, said valve-block being further provided with a conical bore extending entirely therethrough, and a cone-shaped valve-plug seated in said bore and provided with an actuating-stem extending through the wall of the water-chamber, said valve-plug being axially bored and further provided at the upper end of its bore with a radial opening adapted to communicate with either of said radial passages of the valve-block, substantially as described.

6. In an acetylene-generator, the combination with a rectangular outer casing constituting a water-chamber, said casing having diagonally opposite corner portions thereof inwardly bent to form recesses, of an inner casing constituting a generation-chamber within and wholly contained by said outer casing, a transversely-extending water-inlet pipe passed through the walls of said outer and inner casings and having its external closed ends housed within said recesses, said pipe having openings therein communicating with said water and generation chambers, and a valve in said generation-chamber controlling the flow of water thereto through said pipe, substantially as described.

7. In an acetylene generator, the combination of a water-chamber, a generation chamber, a two-way valve-casing, a water-inlet pipe affording communication between said water-chamber and one of the ways of said valve-casing, a blow-off pipe affording communication between the other way of said valve-casing and the atmosphere, and a movable valve in said casing having a duct in constant communication with the generation chamber and adapted to be alternately placed in communication with either of the ways of said valve-casing at the same time closing the other way, substantially as described.

8. In an acetylene generator, the combination of a water-chamber, a generation chamber, a two-way valve-casing, a water-inlet pipe affording communication between said water chamber and one of the ways of said valve-casing, a blow-off pipe affording communication between the other way of said valve-casing and the atmosphere, and a movable valve in said casing having a duct one end of which is in constant communication with the generation chamber while its other end is adapted to be placed in communication with either the water-inlet pipe or the blow-off pipe, substantially as described.

9. In an acetylene generator, the combination of a water-chamber, a generation chamber, a two-way valve-casing, a water-inlet pipe affording communication between said water-chamber and one of the ways of said valve-casing, a blow-off pipe affording communication between the other way of said valve-casing and the atmosphere, and a rotatable valve in said casing, said valve having an axial passage in constant communication at one end with the generation chamber and a lateral passage tapping said axial passage and adapted to be alternately placed in communication with either of the ways of said valve-casing at the same time closing the other way, substantially as described.

RICHARD H. WELLES.

Witnesses:

ALBERT H. GRAVES.

L. F. MCCREA.